United States Patent [19]

Ohnishi

[11] Patent Number: 5,442,463
[45] Date of Patent: Aug. 15, 1995

[54] FACSIMILE MACHINE HAVING TELEPHONE ANSWERING FUNCTION

[75] Inventor: Toru Ohnishi, Kyoto, Japan

[73] Assignee: Murata Kikai Kabushiki Kaisha, Kyoto, Japan

[21] Appl. No.: 114,002

[22] Filed: Aug. 30, 1993

[30] Foreign Application Priority Data

Sep. 2, 1992 [JP] Japan .................. 4-234925
Feb. 5, 1993 [JP] Japan .................. 5-019052

[51] Int. Cl.⁶ ............................... H04N 1/32
[52] U.S. Cl. .................. 358/468; 358/439; 379/97
[58] Field of Search ............ 358/434–442, 358/468, 405, 406; 379/93–94, 96–98, 99–100, 67, 80; H04N 1/32

[56] References Cited

U.S. PATENT DOCUMENTS

| | | |
|---|---|---|
| 4,377,158 | 3/1983 | Friedman et al. . |
| 4,800,439 | 1/1989 | Yoshino .................. 358/438 |
| 4,868,865 | 9/1989 | Ogawa et al. .......... 379/67 |
| 4,939,772 | 3/1990 | Goto ...................... 379/67 |
| 5,014,296 | 5/1991 | Saigano . |
| 5,086,455 | 2/1992 | Satomi et al. . |
| 5,153,912 | 10/1992 | Sakakibara et al. .... 358/400 |
| 5,185,783 | 2/1993 | Takahashi et al. ..... 358/400 |
| 5,293,575 | 3/1994 | Hirai ...................... 379/100 |
| 5,311,573 | 5/1994 | Otsuki ................... 379/100 |

FOREIGN PATENT DOCUMENTS

| | | |
|---|---|---|
| 0415723 | 3/1991 | European Pat. Off. . |
| 0489917 | 6/1992 | European Pat. Off. . |
| 2244867 | 9/1990 | Japan . |
| 4144347 | 9/1992 | Japan . |
| 9214335 | 8/1992 | WIPO . |

Primary Examiner—Edward L. Coles, Sr.
Assistant Examiner—Kim Yen Vu
Attorney, Agent, or Firm—Spensley Horn Jubas & Lubitz

[57] ABSTRACT

If the facsimile machine on the called side detects a facsimile signal such as a CNG signal sent from the calling side after the initiation of the recording operation, the facsimile machine on the called side is switched to the facsimile operation. If the timing for switching to the facsimile operation is within a prescribed period from the initiation of the recording, the facsimile machine on the called side considers that a facsimile message is sent from the calling side without voice message. Then, the data recorded on the called side is erased. If the timing for switching to the facsimile operation is after the prescribed period from the initiation of the recording, the facsimile machine on the called side considers that a facsimile message is sent from the calling side after a voice message. In this case, the data recorded on the called side is maintained.

2 Claims, 11 Drawing Sheets

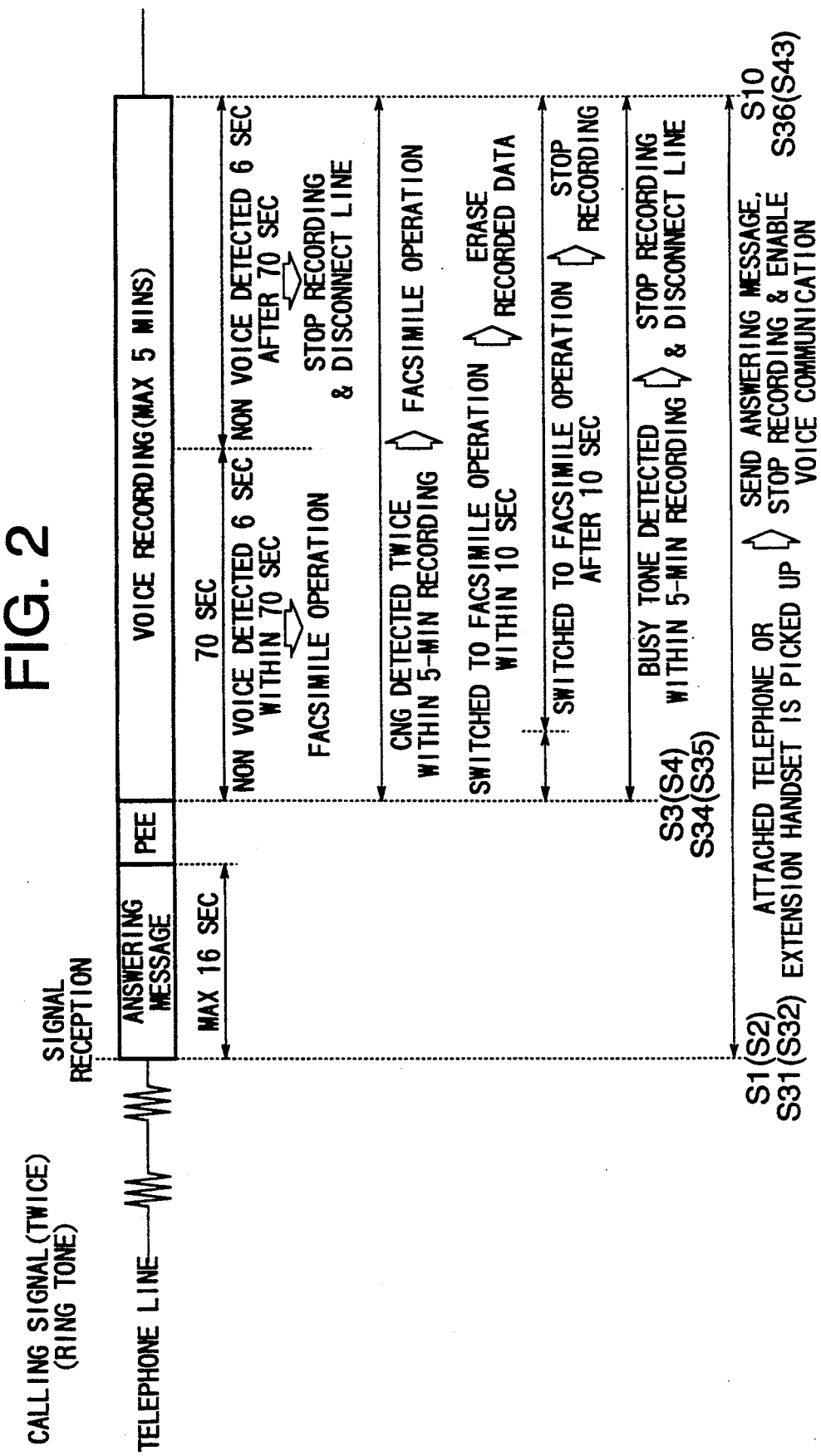

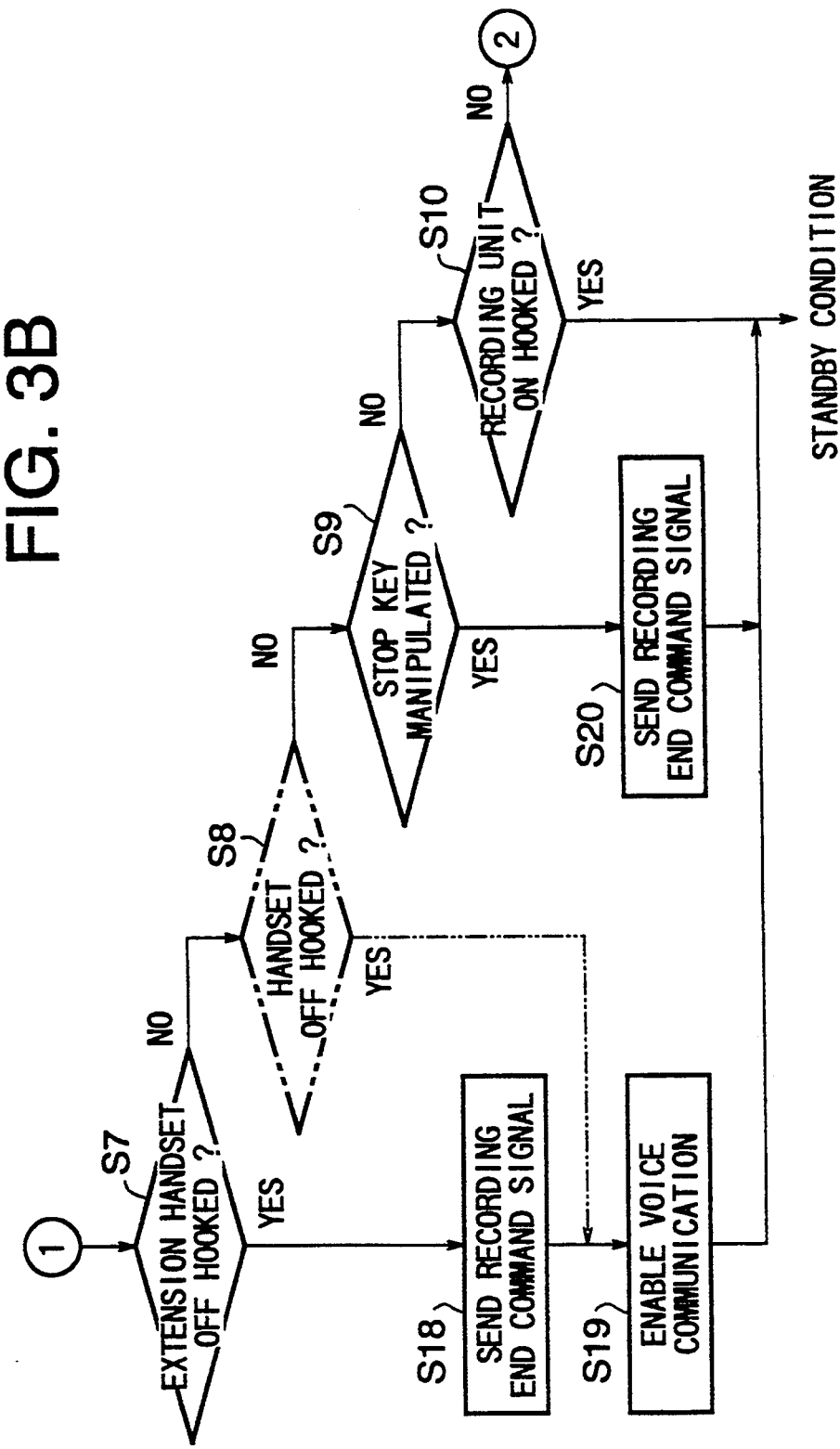

FACSIMILE MACHINE HAVING TELEPHONE ANSWERING FUNCTION

BACKGROUND OF THE INVENTION

1. Technical Field

The present invention relates to a facsimile machine having a telephone answering function which can selectively perform a recording operation and a facsimile operation, i.e., which can selectively record a voice message from a calling side and transmit image data between the calling side and the facsimile machine.

2. Background Art

A facsimile machine having a telephone answering function is known in the art. If such a facsimile machine is set to the answering mode and there is a call from outside, the facsimile machine sends a reception message to the calling side and starts the recording operation. During the recording operation, if the facsimile machine detects a facsimile signal such as a CNG signal sent from the calling side, the facsimile machine switches the connection from the telephone line to the facsimile line so that the facsimile communication is allowed to start. Conventionally, when the facsimile machine is brought into the facsimile operation after the initiation of the recording operation, the recorded voice is always erased.

As a result, if the calling side sends a voice message and a facsimile message in turn, the facsimile machine on the receiving side cannot hold the voice message and an operator on the receiving side cannot know what message is sent.

Regarding this disadvantage, another type of facsimile machine having a telephone answering function is proposed. Specifically, a facsimile machine which does not erase the voice message even if the facsimile operation is started after the initiation of the voice recording. However, this facsimile machine only records a CNG signal of 1,100 Hz or non-voice situation is recorded when the facsimile message is transmitted from the calling side without the voice message. This is uncomfortable to an operator on the receiving side when he plays the recorded information and wastes a memory capacity of the recording unit in the facsimile machine.

A conventional facsimile machine has another problem: If a handset (telephone receiver) or the facsimile machine on the calling side is on-hooked after the initiation of the recording operation on the receiving side, the recorded information is not erased but maintained regardless of presence of the voice message from the calling side. Therefore, if the calling side on-hooks the handset without the voice message, the facsimile machine on the receiving side may record "(no voice)" and a clanging noise. This is also uncomfortable to the operator on the receiving side and wastes the memory capacity of the recording unit of the facsimile machine on the receiving side.

In short, the conventional facsimile machines do not have means for determining whether a voice message is actually sent from the calling side.

SUMMARY OF THE INVENTION

An object of the present invention is to provide a facsimile machine having a telephone answering function which can maintain the recorded information if the facsimile machine is switched to the facsimile operation after the initiation of the recording operation and the voice message (or voice information) is sent from the calling side and which can erase the recorded information if there is no voice message from the calling side.

According to one aspect of the present invention, there is provided a facsimile machine having a telephone answering function, wherein the facsimile machine is selectively used for a recording operation for recording a voice message from a calling side and a facsimile operation for receiving/sending image data from/to the calling side, the facsimile machine includes erasure means for erasing recorded sound, and said erasure means erases the recorded sound if the facsimile operation is initiated within a prescribed period after initiation of the recording operation.

Upon reception of a signal from a calling side, the facsimile machine on the called side sends a voice answering message to the calling side and initiates the recording operation. If the facsimile machine on the called side detects a facsimile signal such as a CNG signal sent from the calling side after the initiation of the recording operation, the facsimile machine on the called side is switched to the facsimile operation.

If the timing for switching to the facsimile operation is within a prescribed period from the initiation of the recording, the facsimile machine on the called side considers that a facsimile message is sent from the calling side without a voice message. Then, the sound recorded on the called side is erased. If the timing for switching to the facsimile operation is after the prescribed period from the initiation of the recording, the facsimile machine on the called side considers that a facsimile message is sent from the calling side after a voice message. In this case, the sound recorded on the called side is maintained.

According to another aspect of the present invention, there is provided a facsimile machine having a telephone answering function, wherein the facsimile machine is selectively used for a recording operation for recording a voice message from a calling side and a facsimile operation for receiving/sending image data from/to the calling side, the facsimile machine includes erasure means for erasing recorded sound and voice measuring means for measuring a period of a voice input during the recording operation, and said erasure means erases the recorded sound if the measured period of the voice is greater than a prescribed period.

Upon reception of a signal from a calling side, the facsimile machine on the called side sends a voice answering message to the calling side and initiates the recording operation. During the recording operation, a length (period) of the voice transmitted to the facsimile machine on the called side from the calling side is measured by the voice measuring means. If the facsimile machine on the called side detects a facsimile signal such as a CNG signal sent from the calling side after the initiation of the recording operation, the recording operation is terminated and the facsimile machine on the called side is switched to the facsimile operation to receive image data from the calling side. If a handset is on hooked on the calling side after the initiation of the recording, the recording operation is terminated on the called side.

When the recording operation is stopped and the length of the voice measured by the measuring means is not larger than a prescribed period, the facsimile machine on the called side considers that there is no voice message from the calling side and the recorded sound is erased by the erasure means. On the other hand, if the measured length of the voice exceeds the prescribed value, the facsimile machine on the called side considers that a voice message is transmitted from the calling side and maintains the recorded sound.

BRIEF DESCRIPTION OF THE DRAWINGS

FIG. 2 is a timing chart showing an operation in the reception mode of the facsimile machine shown in FIG. 1;

FIGS. 3(A) and 3(B) are flowcharts showing the reception mode of a facsimile main body of the facsimile machine shown in FIG. 1;

DETAILED DESCRIPTION OF THE PREFERRED EMBODIMENTS

Now, preferred embodiments of the present invention will be described with reference to the accompanying drawings.

Figure 1:
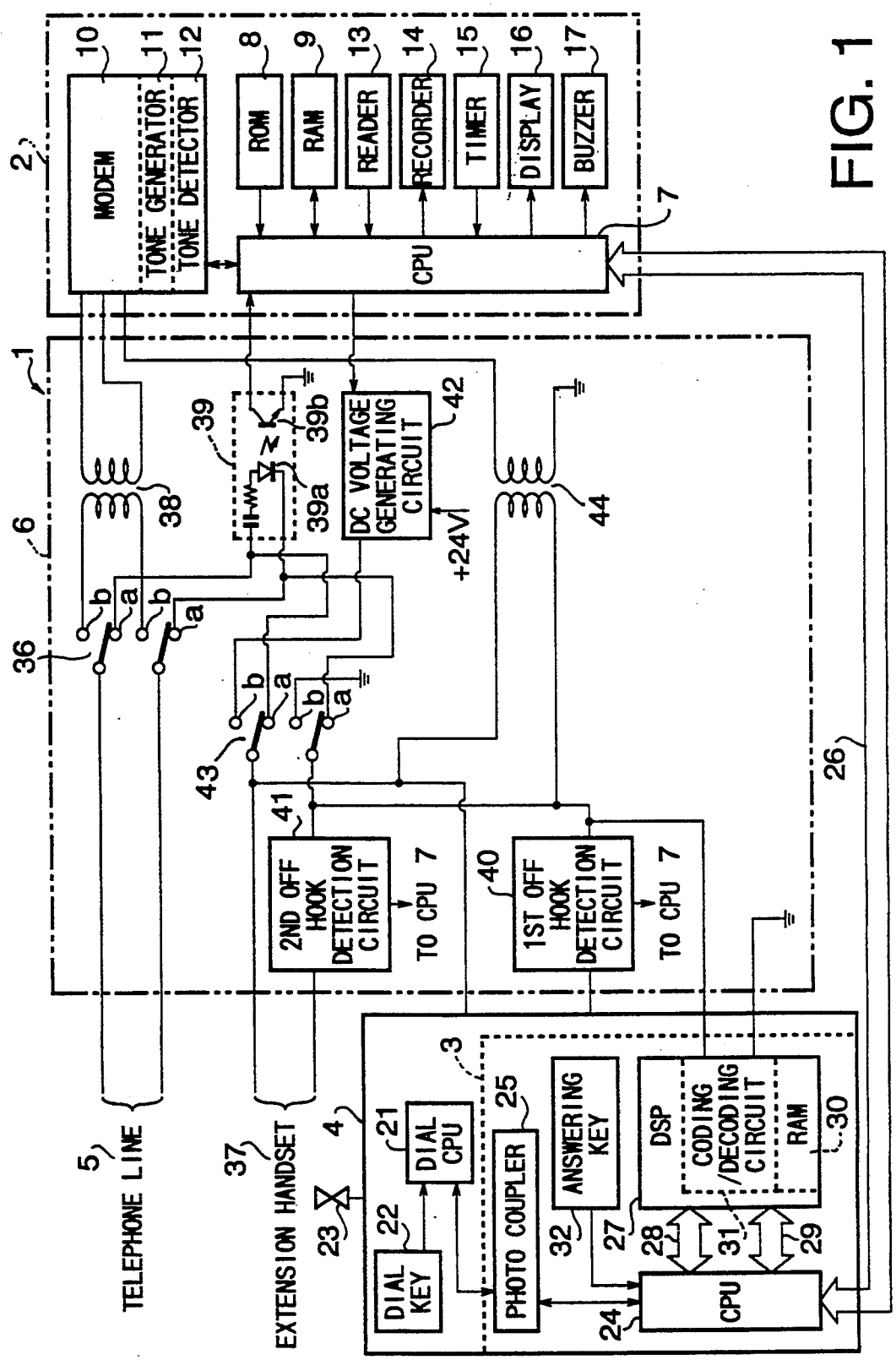
FIG. 1 is a block diagram of a facsimile machine according to a first embodiment of the present invention.

Referring to FIG. 1, a facsimile machine 1 has a facsimile main body 2, an attached telephone 4 which incorporates a recording unit 3, and an NCU (Network Control Unit) 6. The facsimile main body 2 performs image data transmission between itself and another party. The recording unit 3 performs recording of a voice message from another party (calling side). The NCU 6 controls connection with a telephone line 5.

To a CPU 7, connected are a ROM 8 which stores a program for controlling the operation of the facsimile main body 2 and the NCU 6 and a RAM 9 which temporarily stores various information. A modem 10 modulates/demodulates the data (sound inclusive) transmitted between the facsimile machine 1 and another party and detects/generates various signals such as a push-tone signal (DTMF: Dual Tone Mixed Frequency) corresponding to a telephone number of another party, a digital command signal (DCS) and a digital identification signal (DIS).

A tone generating circuit 11 and a tone detecting circuit 12 are incorporated in the modem 10. The tone generator 11 generates a calling tone (CNG: Calling tone) of 1,100 Hz, a called station identification signal (CED: Called station identification) and the like. The tone detector 12 includes a bandpass filter, a zero-cross detector and a level detector (all not shown) to detect the CNG and CED signals from the calling party. When the tone detector 12 detects a tone signal from the calling side, it outputs a frequency and a level of the tone signal to the CPU 7. Upon receiving such data from the tone detector 12, the CPU 7 judges whether the signal is a CNG signal, a CED signal or non-voice.

A reader 13 for reading image on a document to be sent, a recorder 14 for printing information such as the image data sent from the calling station, a timer 15 and a display 16 for displaying various information are also connected with the CPU 7. A buzzer 17 for producing a buzzer sound to inform the operator of the arrival of the information from the calling side and several operation keys (not shown) for the facsimile operation are also connected with the CPU 7.

The attached telephone 4 has a dial CPU 21 to control the overall operation of the telephone 4 except the recording unit 3. A dial key 22 for inputting a telephone number or the like and other devices are connected to the dial CPU 21. A handset 23 belongs to the attached telephone 4.

The recording unit 3 includes a CPU 24 for controlling the overall operation of itself, and the operation of the attached telephone 4 in connection with the telephone answering function is controlled by the CPU 24. The CPU 24 is connected to the dial CPU 21 over a photo-coupler 25 and to the CPU 7 of the facsimile main body 2 over a bus (serial bus) 26 for a serial communication. Thus, the serial communication is possible between the CPU 24 of the recording unit 3, and the dial CPU 21 of the attached telephone 4 and the CPU 7 of the facsimile main body 2.

A digital signal processor (DSP) 27 is provided for digital-processing the voice signal, and it is connected to the CPU 27 over an address bus 28 and a data bus 29. The DSP 27 includes a RAM 30 for storing the voice data in the form of coded data and a coding/decoding circuit 31 for coding/decoding the voice data. The DSP 27 detects a busy tone which is generated upon line disconnection on the calling side.

To the CPU 24 of the recording unit 3, connected are various operation keys such as an answering key 32 for setting/releasing an answering/facsimile mode (will be described) and a play-back key (not shown) for playing the voice data stored in the RAM 30.

A CML relay 36 is provided for selectively connecting the telephone 5 with the telephone 4/37 side and the modem 10 side of the facsimile main body 2. In addition to the attached telephone 4 which is incorporated in the facsimile machine 1, extension handset 37 is provided to be selectively connectable with the facsimile machine 1 by a cable (not shown). When the CML relay 36 is switched to a point a under the control of the CPU 7 of the facsimile main body 2, the telephone line 5 is connected to the telephone 4/37 side. On the other hand, if the CML relay 36 is switched to a contact b, the telephone line 5 is connected to the modem 10 over a transformer 38.

A signal arrival or signal reception detector 39 has a photo-coupler, an LED 39a is connected to the point a of the CML relay 36 and a photo-transistor 39b is connected to the CPU 7 of the facsimile main body 2. The CPU 7 monitors the on/off of the photo-transistor 39b and detects the presence of a calling signal of 16 Hz on the telephone line 5. First and second off hook detecting circuits 40 and 41 are connected to the attached telephone 4 and the extension handset 37 to detect the off hook state ("off hook state" represents a case where a handset is picked up and a case where the recording unit 3 is being operated if the attached telephone 4 is concerned) of the respective telephones 4 and 37 and output the result to the CPU 7 of the facsimile machine 1. The detection result from the off hook detector 40 on the attached telephone 4 side is also output to the dial CPU 2 of the attached telephone 4.

A DC voltage generating circuit 42 is provided for supplying a prescribed current to the telephones 4 and 37 to detect the off hook of the telephones 4 and 37. A voltage of +24 volts is applied as an input voltage. Specifically, when the telephones 4 and 37 are off hooked, the change of the current fed to the telephones 4 and 37 are detected by the off hook detectors 40 and 41. Then, the CPU 7 of the facsimile main body 2 or the dial CPU 21 of the attached telephone 4 recognizes the off hook state on the basis of the current variation detected by the off hook detectors 40 and 41.

If the handset is on hooked on the calling side and the line is disconnected while the recording unit 3 is recording the information on the receiving side, the polarity of the current flowing through the telephone line 5 is reversed and the current on the telephone line 5 is interrupted immediately upon the polarity reversal. Then, the current interruption on the telephone line 5 upon the instantaneous polarity reversal (referred to as "instantaneous interruption") is detected by the first off hook detecting circuit 40. Upon detection of this instantaneous interruption, the CPU 7 of the facsimile main body 2 recognizes that the handset is on hooked on the calling side.

The DC voltage generating circuit 42 is selectively connected to the telephones 4 and 37, and the telephone line 5 over a TEL relay 43. When the TEL relay 43 is switched to the point a under the control of the CPU 7 of the facsimile main body 2, the telephones 4 and 37 are connected to the telephone line 5 side. On the other hand, if the TEL relay 43 is switched to the point b, the telephones 4 and 37 are connected to the DC voltage generator 42 side. The transformer 44 is connected to the telephones 4 and 37 on its input side and to the modem 10 on its output side.

As mentioned earlier, the setting and releasing of the answering/facsimile mode of the facsimile machine 1 is conducted upon manipulation of the answering key 32. If this mode is released, the mode of the facsimile machine 1 is set to a telephone/facsimile mode. In any mode of operation, the CML relay 36 and a TEL relay 43 are switched to the point a during a communication standby situation.

In the answering/facsimile mode of operation, if a calling signal of 16 Hz is transmitted from a calling side via a telephone exchange, the CPU 7 of the facsimile main body 2 detects the calling signal at the signal reception detector 39. Upon detecting the calling signal predetermined times (twice in this embodiment), the CPU 7 outputs a signal reception command signal to the CPU 24 of the recording unit 3 to inform the CPU 24 of the signal arrival. Then, the CPU 24 of the recording unit 3 connects the line and activates the DSP 27 to read the voice data to send the answering message. The voice data is recorded and stored in the RAM 30 beforehand. After that, the DSP 27 causes the coding circuit 31 to decode the answering message voice data and sends it to the telephone line 5 over the CPU 6.

Upon completion of the reading of the answering message voice, the CPU 24 of the recording unit 3 initiates the recording operation by the DSP 27 while sending the recording start signal to the CPU 7 of the facsimile main body 2 to inform the CPU 7 of the start of the recording operation. Upon reception of the voice message from the calling side. The DSP 27 decodes the voice message in the coding/decoding circuit 31 and stores it in the RAM 30.

In this embodiment, the maximum recording period of the ROM 30 is 20 minutes and the maximum recording period for one recording operation is 5 minutes. The data of the voice message from the calling side is successively accumulated in the RAM 30 at every recording. The shorter the recording period at one recording, the larger the number of the voice recordings accumulated in the RAM 30.

Referring now to FIG. 2, if the CNG signal from the calling side is detected twice by the tone detecting circuit 12 after the initiation of the recording operation or non-voice situation is continually detected by the tone detecting circuit 12 for 6 seconds within 70 seconds from the beginning of the recording operation, the CPU 7 of the facsimile main body 2 switches the CML relay 36 from the point a to the point b. Specifically, the CPU 7 of the facsimile main body 2 considers that the calling side is a facsimile and switches the connection with the telephone line 5 from the telephone 4/37 side to the modem 10 side to start a prescribed facsimile operation.

In this embodiment, erasing means comprises the CPU 7 of the facsimile main body 2, the CPU 24 and DSP 27 of the recording unit 3 and the RAM 30 of the DSP 27.

Specifically, upon input of the recording start signal from the CPU 24 of the recording unit 3, the CPU 7 of the facsimile main body 2 activates the timer 15 to measure a period of 10 seconds. During the 10-second measuring by the timer 15, i.e., if the facsimile operation is started within 10 seconds from the initiation of the recording operation of the DSP 27, the CPU 7 of the facsimile main body 2 sends a recording end/erasure command signal (simply referred to as "erasure command signal") to the CPU 24 of the recording unit 3. On the other hand, if the facsimile operation is started after the elapse of 10 seconds, the CPU 7 sends a recording end command signal to the CPU 24 of the recording unit 3.

Upon input of the erasure command signal, the CPU 24 of the recording unit 3 stops the recording operation of the DSP 27 and erases the data (sound) just recorded in the RAM 30. If the CPU 24 receives the cording end command signal, it stops the recording operation of the DSP 27 and maintains the sound just recorded in the RAM 30.

The telephone/facsimile mode will be briefly described. Upon twice detection of the calling signal from the calling side by the signal reception detector 39, the CPU 7 of the facsimile main body 2 switches the CML relay 36 to the point b and sends a pseudo ring-back tone to the calling side while starting the detection of the CNG signal from the calling side. If the CNG signal is detected and it is considered that the calling side is a facsimile, a prescribed facsimile operation is executed.

If the CNG signal is not detected after the pseudo ring-back tone is transmitted predetermined times, the CPU 7 activates the buzzer 17 to generate the buzzer sound since the calling side may be a telephone. If the attached telephone 4 or extension handset 37 is off hooked upon the buzzer sound, the CML relay 36 is switched to the point a so as to enable the voice communication between the telephone on the calling side and the telephone on the called side. If the calling side is a facsimile and the telephone 4 or 37 is off hooked on the called side, the facsimile machine 1 on the called side is used for the facsimile operation as it detects a facsimile signal such as a CNG signal. If the telephone 4 or 37 is not off hooked, the facsimile machine 1 is set to the facsimile operation after a predetermined period.

Next, the operation of the facsimile machine 1 will be explained with a timing chart shown in FIG. 2 and the flowcharts shown in FIGS. 3(A) and 3(B).

Figure 3A:
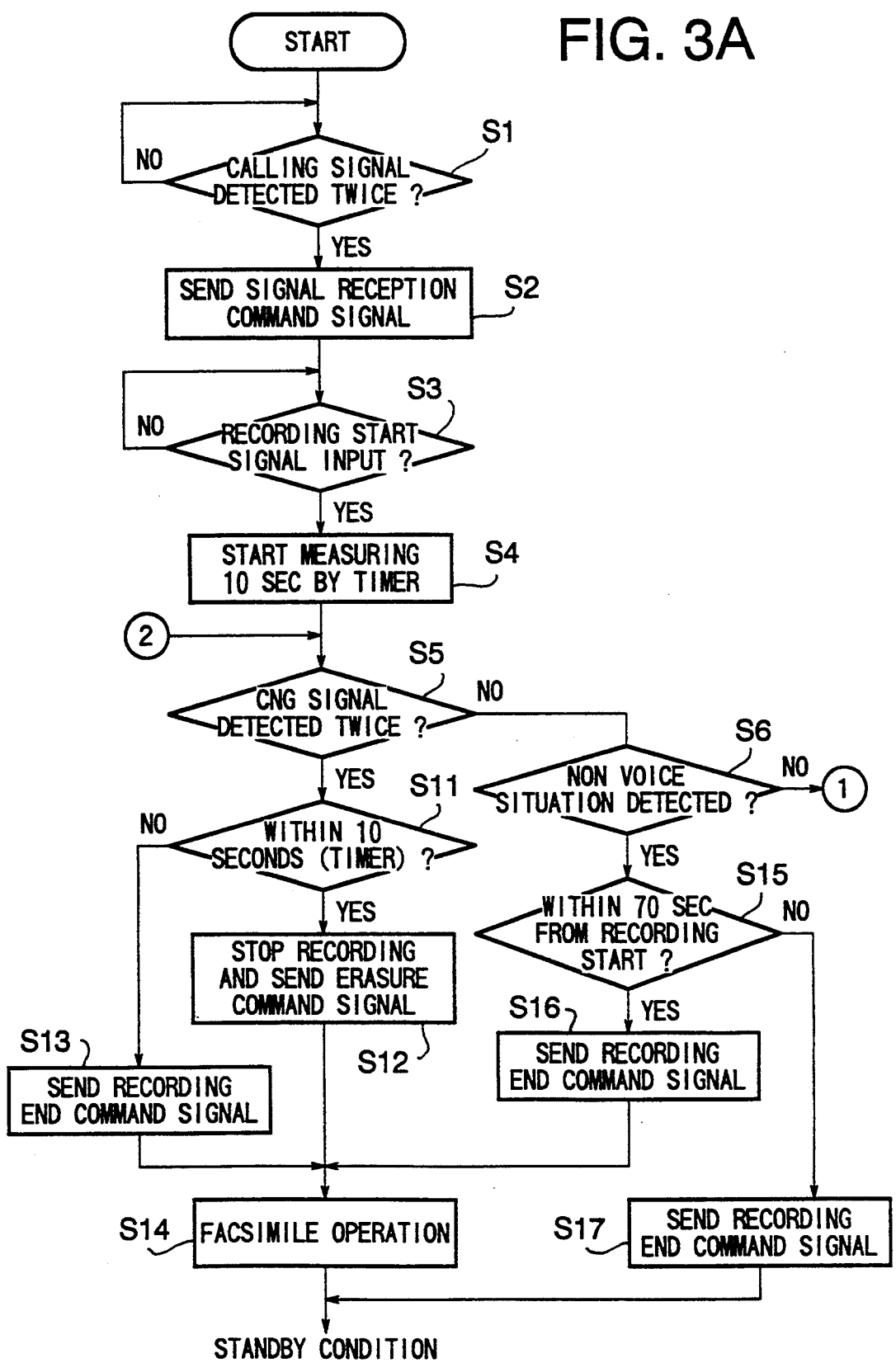
Figure 4:
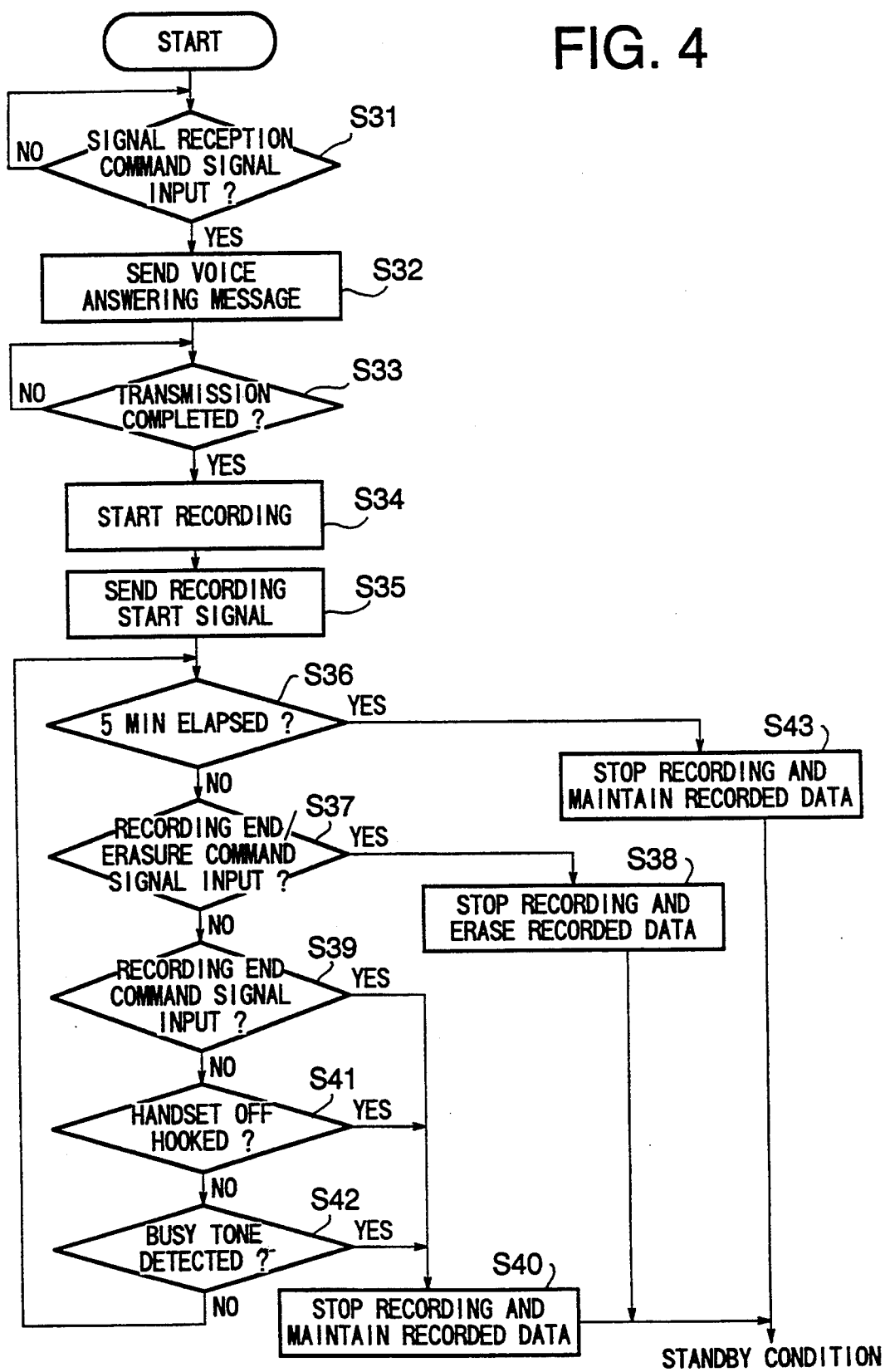
FIG. 4 is a flowchart of an reception mode of a recording unit of the facsimile machine according to the first embodiment.

The facsimile main body 2 of this embodiment operations as indicated by the flowcharts of FIGS. 3(A) and 3(B) under the control of the CPU 7. FIGS. 3(A) and 3(B) show a case where the mode of operation is set to the answering/facsimile mode, and the CML relay 36 and the TEL relay 43 are both switched to the point a as shown in FIG. 1.

When a calling signal of 16 Hz is transmitted from the calling side over the telephone line 5 and the calling signal is detected twice by the signal reception detector 39, the signal reception signal is sent to the CPU 24 of the recording unit 3 over the serial bus 26 to inform the signal reception (S1 and S2).

After that, the answering voice message is sent to the calling side from the recording unit 3, and now awaited from the CPU 24 of the recording unit 3 to the CPU 7 is a recording start signal for the initiation of the recording operation (S3). Although not shown in the flowchart, if the attached telephone 4 or extension handset 37 is off hooked before the recording start signal is input from the CPU 24 of the recording unit 3, the recording unit 3 is deactivated and the voice communication is enabled.

If the recording start signal indicative of the start of the recording operation is input from the CPU 24 of the recording unit 3 at step 2, the timer 15 is activated to start the measuring of 10-second period (S4). After the activation of the timer 15 and before the detection of the on hook of the recording unit 3 by the first off hook detecting circuit 40, the judgment operation as shown in FIGS. 3(A) and 3(B) is performed. Specifically, during the recording operation by the recording unit 3, it is judged whether the CNG signal has been detected twice, a non-voice situation has continued 6 seconds, the handset 23 of the attached telephone 4 or the extension handset 37 has been off hooked, a stop key (will be described) has been manipulated and the first off hook detector 40 has detected the on hook of the recording unit 3 (S5–S10).

These judgments will be explained with FIG. 3(A). First, it is judged whether the CNG signal is detected twice. If the CNG signal is detected twice, then it is judged whether the timer 15 indicates a time within 10 seconds (S5 and S11). If the answer is yes, i.e., if the CNG signal is detected twice within 10 seconds from the input of the recording initiation signal, it is considered that there is no voice message from the calling side and the erasure command signal is sent to the CPU 24 of the recording unit 3 (S12). On the other hand, if the CNG signal is detected twice after 10 seconds from the input of the recording initiation signal, then it is considered that there is a voice message from the calling side and a recording end command signal is sent to the CPU 24 of the recording unit 3 (S13).

Upon sending one of these two signals, the CML relay 36 is switched to the point b so that the telephone line 5 is connected with the modem 10 side. Accordingly, a prescribed facsimile operation is initiated to receive the image data from the calling side (S14).

Specifically, if the CNG signal from the calling side is detected twice, it is considered that the calling side is a facsimile. Then, predetermined facsimile signals are transmitted between the calling and called sides (e.g., a CED signal and a DIS signal are transmitted to the calling side from the called side and a DCS signal is transmitted to the called side from the calling side.). After that, the recorder 14 is activated to print the image data sent from the calling side on a recording sheet. Upon completion of facsimile data reception, the line is disconnected and the facsimile machine 1 is brought into a standby state (the answering/facsimile mode in this embodiment).

It should be noted that the CNG signal is regularly sent from the calling side every three seconds and each signal lasts 0.5 second. Detecting the CNG signal twice means successively detecting the CNG signal twice at a three-second interval. The frequency of the CNG signal is 1,110 Hz and the frequency range of a human voice includes this value (1,100 Hz). Therefore, it is not possible to reliably Judge by the once detection of the CNG signal whether it is a human voice or a CNG signal. Here, it should also be noted that the CNG signal of 0.5 second is regularly transmitted at the 3-second intervals whereas the human voice signal is transmitted random. Thus, if a signal of 1,110 Hz is detected twice at a 3-second interval, it is believed without doubt that this signal is a CNG signal and it is possible to reliably judge that the calling side is a facsimile and the facsimile operation can be started. If the time interval between the first detection and the second detection of a signal of 1,100 Hz is not in a range of 2.5–6 seconds, it is not believed that this signal is a CNG signal and therefore the facsimile operation is not started.

If the CNG is not detected twice at step 5, it is judged whether a non-voice situation continues 6 seconds (S6). If the answer is yes, it is then Judged whether the non-voice situation detecting time is within 70 seconds from the input of recording start signal from the CPU 24 of the recording unit 3 (S15). If it is detected within 70 seconds, a recording end command signal is sent to the CPU 24 of the recording unit 3 (S16) before the program proceeds to step 14. If the non-voice detection time is after 70 seconds from the input of the recording start signal, a recording end command signal is sent to the CPU 24 of the recording unit 3 (S17). Then, the line is disconnected and the facsimile machine 1 is brought into the stand-by condition.

Specifically, if a voice signal or the like is not detected for 6 seconds or a non-voice situation lasts 6 seconds, it is considered that the transmission of the voice message from the calling side is terminated or there has not been no voice message. If the non-voice situation is detected after 70 seconds from the input of the recording start signal or the initiation of the recording, it is considered that only the voice message is sent from the calling side. As a result, the recording end command signal is sent to the CPU 24 of the recording unit 3 and the line is disconnected. On the other hand, if the non-voice situation is detected within 70 seconds from the start of the recording operation, it is considered that the calling side has transmitted a voice message and a facsimile message (image data) or only the facsimile message. A fact that the CNG signal is not detected at step 5 indicates that the CNG signal is not detected since the calling side sends a facsimile message by way of manual transmission. After that, the facsimile operation is started.

If the non-voice situation is not detected at step 6, it is judged whether a detection signal indicative of the off hook of the extension handset 37 is input from the second off hook detecting circuit 41 (S7), as shown in FIG. 3(B). If the off hook detection signal is input, the recording end command signal is sent to the CPU 24 of the recording unit 3 and the voice communication becomes available (S18 and S19). If the handset 23 of the attached telephone 4 is off hooked, the voice communication is made available without sending the recording end command signal (S8 and S19).

The CPU 7 of the facsimile main body 2 recognizes the off hook state of the attached telephone 4 based on the detection signal from the first off hook detecting circuit 40. However, the first off hook detecting circuit 40 detects as the off hook state not only when the handset 23 is actually off hooked and but also when the recording unit 3 is activated. Therefore, the CPU 7 of the facsimile main body 2 can not judge whether the detected off hook state is the off hook of the handset 23 or the activation of the recording unit 3.

Accordingly, the on/off of the handset 23 is detected by the dial CPU 21 based on an on/off of a hook switch (not shown) provided at a place where the handset is placed, and the result is sent to the CPU 24 of the recording unit 3. When the CPU 24 is informed of the picking up of the handset 23 and the off of the hook switch, it stops the recording operation and the voice communication is made available.

Therefore, the judgment whether the handset 23 is off hooked at step 8 is actually made by the CPU 24 of the recording unit 3, not by the CPU 7 of the facsimile main body 2. However, it is explained in connection with step 8 for an easier understanding.

If the calling side is a telephone at step 19, the voice communication is made between the calling side and the called side. If the facsimile communication is desired after the voice communication, a start key (not shown) is manipulated to start the facsimile operation. If the calling side is a facsimile and a facsimile signal such as a CNG signal is sent from the calling side, the facsimile machine 1 of the called side is switched to the facsimile operation. After completion of the voice communication or facsimile communication, the line is disconnected and the facsimile machine 1 is brought into the standby condition.

If the detection signal indicative of the off hook state is not input at steps 7 and 8, it is judged whether a stop key (not shown) is manipulated (S9). The stop key is connected to the CPU 7 of the facsimile main body 2 to deactivate the facsimile operation. Upon manipulation of the stop key, the recording end command signal is sent to the CPU 24 of the recording unit 3, the line is disconnected and the facsimile machine 1 is brought into the standby condition.

If the on hook of the recording unit 3 is detected by the first off hook detecting circuit 40 without detection of the CNG signal, the non-voice situation, the off hook of the telephones 37 and 4 and the manipulation of the stop key at steps 5-10, the line is disconnected and the facsimile machine 1 is brought into the standby condition. For example, the recording unit 3 is on hooked if the busy tone is detected or a maximum recording period (5 minutes) elapses on the recording unit 3 side during the recording operation. Then, when the on hook of the recording unit 3 is detected by the first off hook detecting circuit 40, the judgment at step 10 becomes yes and the line is disconnected to bring the facsimile machine 1 into the standby condition.

On the other hand, in response to the operation of the facsimile main body 2, the recording unit 3 performs its own operation under the control of the CPU 24, as shown in FIG. 3C. Specifically, upon input of the signal reception command signal from the CPU 7 of the facsimile main body 2 (S31), the DSP 27 is activated and the data of answering voice message is read from the RAM 30. This data is decoded by the coding/decoding circuit 31 and sent to the calling side via the NCU 6 and the telephone line 5 (S32). Although not shown in the flowchart, if the telephone 4 or 37 is off hooked while the answering voice message is being sent, the transmission of the answering voice message of the DSP 27 is terminated and the facsimile machine 1 is brought into the standby condition.

Upon completion of the answering voice message, the DSP 27 starts the recording and the recording start signal is sent to the CPU 7 of the facsimile main body 2 (S33-S35). If the voice message arrives from the calling side, the data of the voice message is coded in the coding/decoding circuit 31 and stored in the RAM 30. If the CNG signal is transmitted from the calling side, it is also recorded and stored in the RAM 30.

If the erasure command signal is input from the CPU 7 of the facsimile main body 2 before the maximum recording period (5 minutes) elapses from the initiation of the recording, the recording operation by the DSP 27 is stopped and the data (sound) recorded in the RAM 30 by this recording operation is erased (S36-S38). Then, the facsimile machine 1 is brought into the standby condition.

If the record end command signal is input during the maximum recording period of 5 minutes, the recording operation by the DSP 27 is stopped and the sound recorded in the RAM 30 by this recording operation is maintained (S39 and S40). Then, the facsimile machine 1 is brought into the standby condition.

If the off hook of the handset 23 of the attached telephone 4 is detected by the dial CPU 21 during the maximum recording period (5 minutes), the program proceeds to step 40 (S41). In this case, the voice communication is permitted. If the busy tone is detected by the DSP 27 during the maximum recording period (5 minutes), the program proceeds to step 40 (S42).

If 5 minutes elapses without the detection of the input of the erasure command signal, the input of the recording end command signal, the off hook of the handset 23 or the busy tone, the recording operation of the DSP 27 is stopped and the sound recorded in the RAM 30 by this recording operation is maintained (S42). Then, the facsimile machine 1 is brought into the standby condition.

As mentioned above, when the facsimile machine 1 having an answering function of the embodiment is set to the answering/facsimile mode and receives a signal from the calling side, the DSP 27 of the recording unit 3 is activated, the voice answering message is sent to the calling side from the RAM 30 and the recording operation is initiated. After the initiation of the recording operation, if the CNG signal from the calling side is detected twice or the non-voice situation is continually detected 6 seconds within 70 seconds from the initiation of the recording operation, the facsimile machine 1 considers that the calling side is a facsimile and uses itself for the facsimile operation.

If the detection timing for the CNG signal, i.e., the timing for the switching to the facsimile operation is within 10 seconds from the initiation of the recording operation, it is considered that there is no voice message from the calling side and only a facsimile message is sent. Then, the recording operation is terminated and the sound recorded in the RAM 30 during this recording operation is erased. If the timing for the switching to the facsimile operation is after 10 seconds from the initiation of the recording operation, it is considered that the facsimile communication is made after the voice message. Then, the recording operation is terminated and the sound recorded in the RAM 30 during this recording operation is maintained.

In other words, a fact that the operation is switched to the facsimile operation within a short period (10 seconds) from the initiation of the recording operation is believed to indicate that there is no voice message from the calling side. In such a case, the recorded information is erased so that it is possible to reliably avoid a case where only the CNG signal of 1,100 Hz is recorded or the non-voice situation is recorded. This eliminates a problem of unpleasantness to the operator upon playing the recorded data (sound) and the waste of the memory capacity in the RAM 30 of the recording unit 3. On the other hand, the switching to the facsimile operation after 10 seconds from the initiation of the recording operation is believed to indicate that there is a voice message from the calling side. In such a case, the recorded information is not erased but maintained. Therefore, the operator on the called side can play and know the voice message. This eliminates a problem of undesired erasure of necessary voice message.

It should be noted that the present invention is not limited to the above described embodiment and various modifications and changes may be made within the scope and spirit of the present invention. For example, the measuring period by the timer 15 may be set to a value other than 10 seconds, the non-voice situation detecting period may be set to a value other than 6 seconds, and the switching to the facsimile operation may be executed when the CNG signal is detected once.

Next, a second embodiment of the present invention will be explained with reference to FIGS. 5 to 9.

Same numerals are assigned to same elements in FIGS. 1 to 4 and 5 to 9 so that the explanation of the elements which have already been made in connection with FIGS. 1 to 4 is occasionally omitted in the following description.

Figure 5:
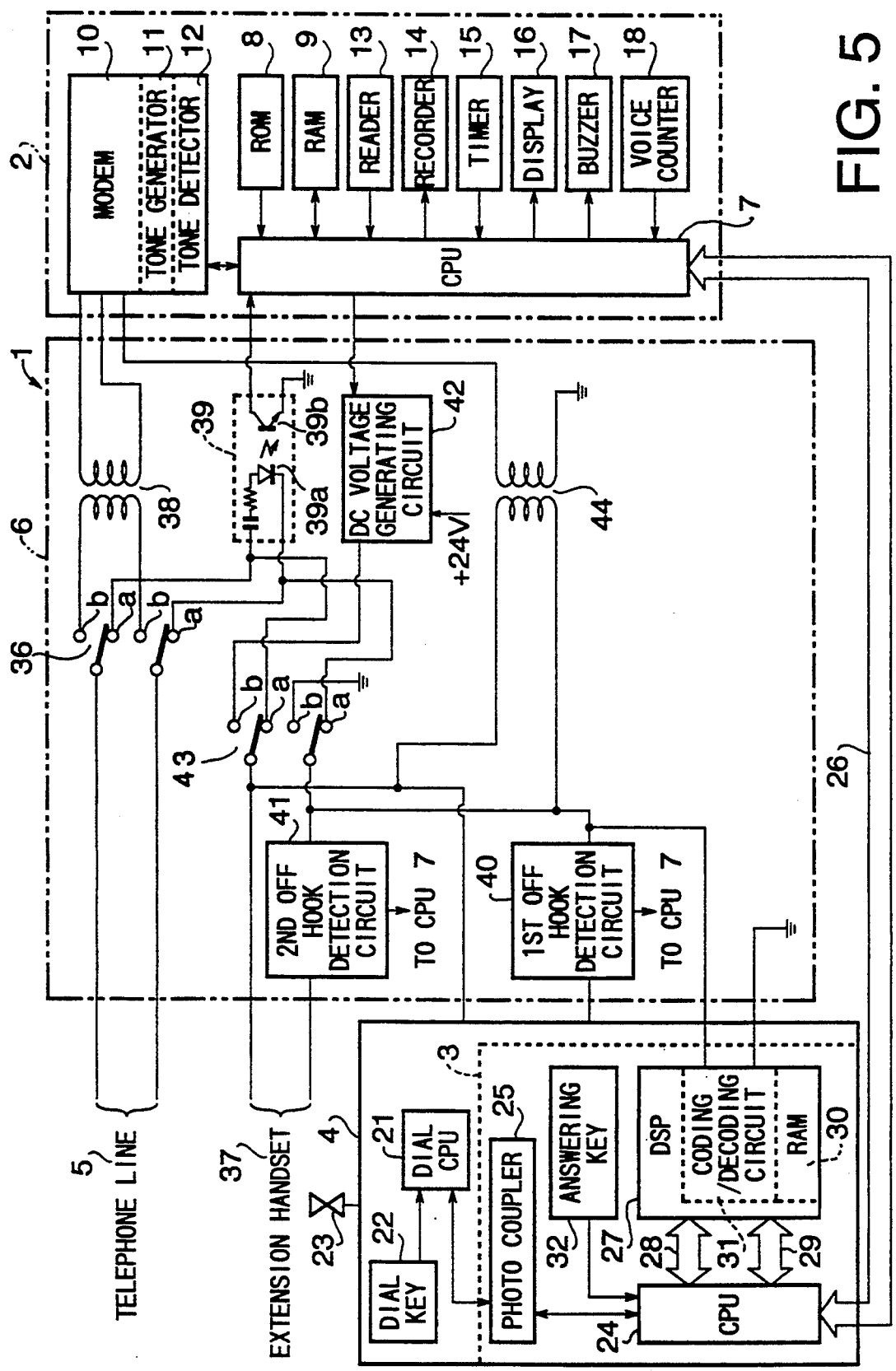
FIG. 5 is a block diagram of a facsimile machine according to a second embodiment of the present invention.

In FIG. 5, a voice counter 18 is connected to the CPU 3 of the facsimile main body 2 as voice measuring means.

Upon input of the recording start signal from the CPU 24 of the recording unit 3, the CPU 7 of the facsimile main body 2 activates the voice counter 18 to measure time of a voice input to the facsimile machine 1 over the telephone line 5. In this embodiment, the "voice" includes any sound, e.g., a voice message sent from the calling side and a clanging sound which is generated upon generation of the CNG signal or the instantaneous interruption.

Figure 7:
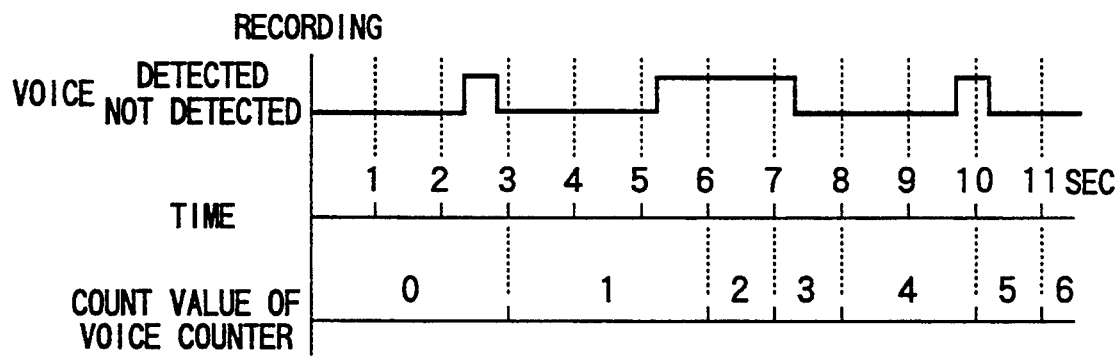
FIG. 7 is a timing chart showing a voice time measuring operation by a voice counter.

Next, the time measuring operation will be explained with reference to FIG. 7. When the CPU 7 of the facsimile main body 2 detects a voice by means of the tone detecting circuit 12 in a one-second section, it activates the voice counter 18 for the counting. If there is no voice in the section, the voice counter 18 does not count at all, but if even a small voice is found in the section, the voice counter 18 counts it. Therefore, if a single continuous voice extends through, for example, a three sections, the voice counter 18 counts three.

As understood from the above, the voice counter 18 counts the number of the sections in which the voice can be found, but does not count the actual length (period) of the voice. However, the count value of the voice counter 18 is considered as the length (period) of the voice in this embodiment.

Figure 6:
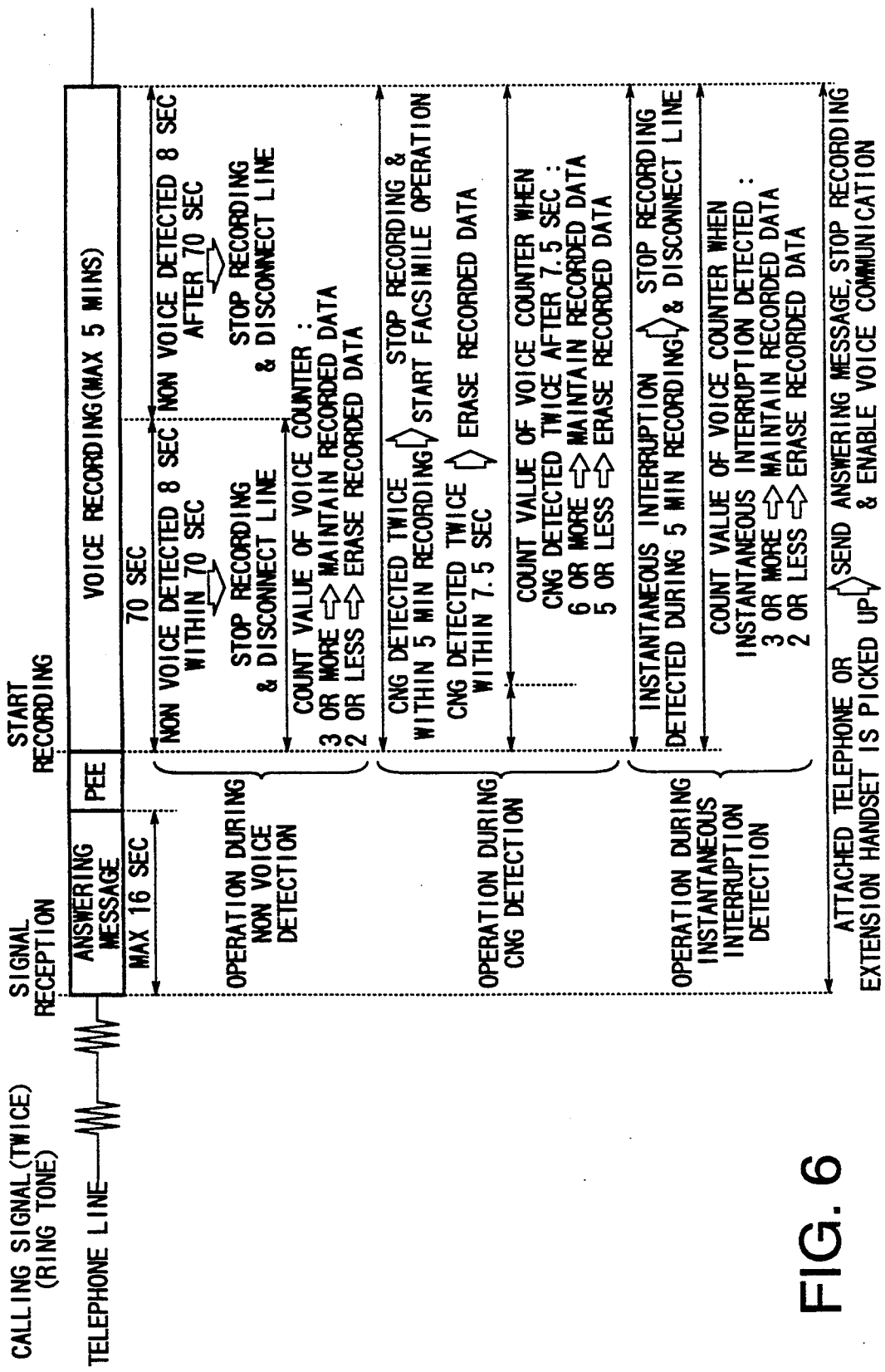
FIG. 6 is a timing chart showing an operation in the reception mode of the facsimile machine shown in FIG. 5.

Referring to FIG. 6, if the CNG signal from the calling side is detected by the tone detector 12 prior to the initiation of the recording operation or the non-voice situation continues eight seconds within seventy seconds from the initiation of the recording operation, the CPU 7 of the facsimile main body 2 switches the CML relay 36 to the point b from the point a. In other words, the CPU 7 of the facsimile main body 2 considers that the calling side is a facsimile and switches the connection with the telephone line 5 to the modem 10 side from the telephone 4/37 side so as to start a prescribed facsimile operation. If the instantaneous interruption is detected by the first off hook detector 40 after the initiation of the recording operation, the CPU 7 of the facsimile main body 2 considers that the calling side on hooks a handset and disconnects the line.

In this embodiment, the erasure means includes the CPU 7, the ROM 8 and the RAM 9 of the facsimile main body 2, the CPU 24 and the DSP 27 of the recording unit 3 and the RAM 30 of the DSP 27.

Upon input of the recording start signal from the CPU 24 of the recording unit 3, the CPU 7 of the facsimile main body 2 activates the timer 15 to measure a period of seven seconds and half. During the seven-second-and-half period which is measured by the timer 15, i.e., if the CNG signal is detected twice within seven seconds and half from the initiation of the recording operation of the DSP 27, the CPU 7 of the facsimile main body 2 sends a recording end/erasure command signal (simply referred to as "erasure command signal") to the CPU 24 of the recording unit 3.

On the other hand, if the CNG signal is detected twice after seven seconds and half, the CPU 7 of the facsimile main body 2 determines on the count value counted by the voice counter 18 during the recording operation whether the recorded sound in the RAM 30 of the DSP 27 should be erased or not. Specifically, if the count value of the voice counter 18 is a predetermined value ("five" in the illustrated embodiment) or less, the CPU 7 sends an erasure command signal to the CPU 24 of the recording unit 3 whereas if the count value is six or more, it sends a recording end command signal to the CPU 24 of the recording unit 3.

If the non-voice situation is detected for eight seconds and the count value of the voice counter 18 is not greater than a prescribed value ("three" in this embodiment), the CPU 7 of the facsimile main body 2 sends the erasure command signal to the CPU 24 of the recording unit 3 whereas if the count value is three or more, it sends the recording end command signal to the CPU 24.

When the instantaneous interruption is detected and the count value of the voice counter 18 is not greater than a prescribed value ("three" in this embodiment), the CPU 7 of the facsimile main body 2 sends the erasure command signal to the CPU 24 of the recording unit 3 whereas when the count value is three or more, it sends the recording end command signal to the CPU 24.

Upon input of the erasure command signal, the CPU 24 of the recording unit 3 stops the recording operation of the DSP 27 and erases the just recorded sound which is stored in the RAM 30. Upon input of the recording end command signal, the CPU 24 stops the recording operation of the DSP 27 and maintains the sound just stored in the RAM 30.

Next, the operation of the facsimile machine 1 of this embodiment will be explained with a timing chart shown in FIG. 6 and flowcharts shown in FIGS. 8(A)–8(C) and 9. The program for FIG. 8 and that for FIG. 9 proceed parallel while certain relation being maintained therebetween.

Figure 8A:
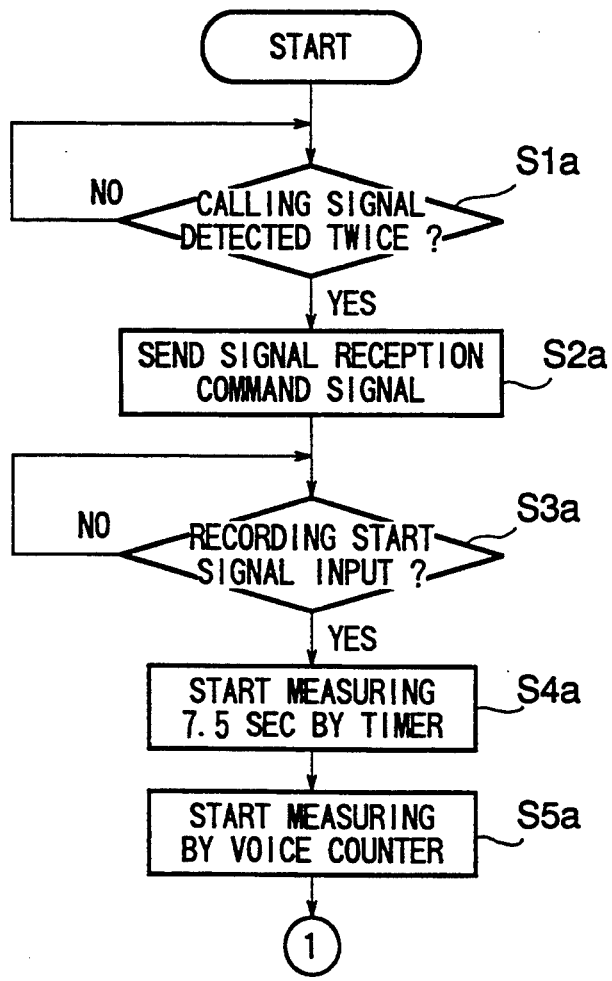
FIGS. 8(A)-8(C) are flowcharts showing an reception mode of a recording unit of the facsimile machine according to the second embodiment.
Figure 8B:
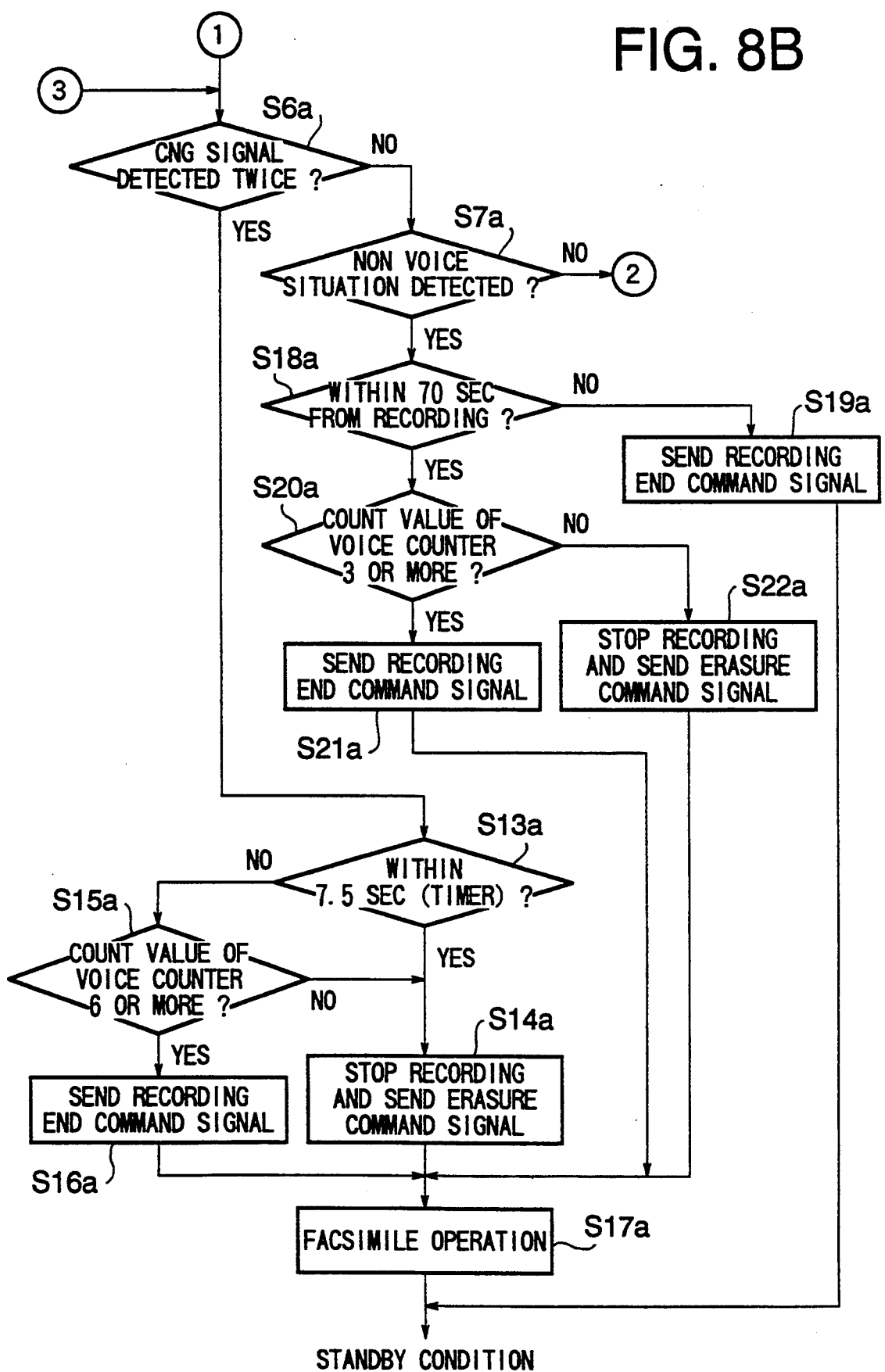
Figure 8C:
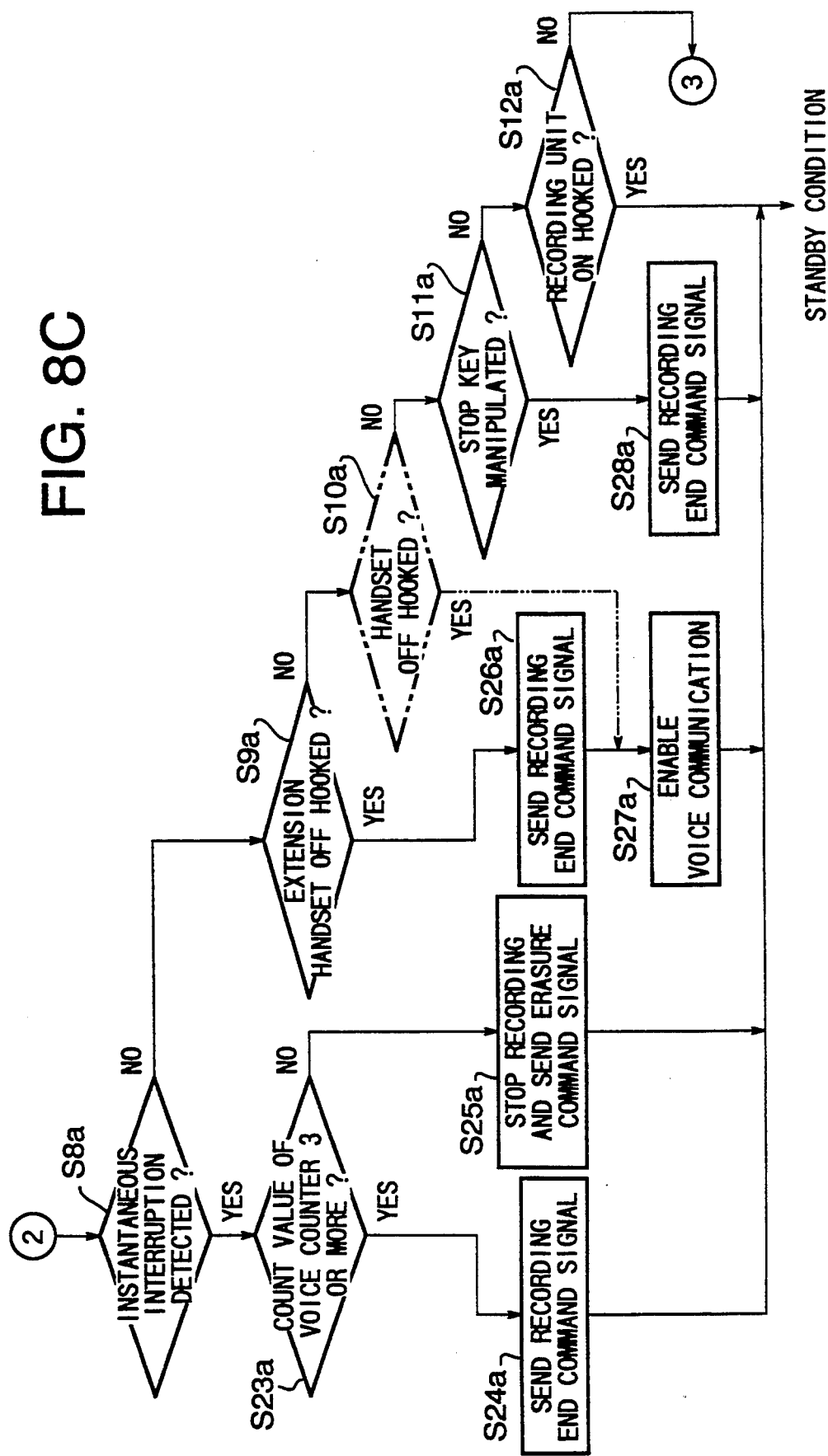

The facsimile main body 2 of this embodiment operations as indicated by the flowcharts of FIGS. 8(A)–8(C) under the control of the CPU 7. FIGS. 8(A)–8(C) show a case where the mode of operation is set to the answering/facsimile mode and the CML relay 36 and the TEL relay 43 are both switched to the point a as shown in FIG. 5.

When a calling signal of 16 Hz is transmitted from the calling side over the telephone line 5 and the calling signal is detected twice by the signal reception detector 39, the signal-reception signal is sent to the CPU 24 of the recording unit 3 over the serial bus 26 to inform the signal reception (S1a and S2a).

After that, the answering voice message is sent to the calling side from the recording unit 3, and awaited from the CPU 24 of the recording unit 3 to the CPU 7 is a recording start signal for the initiation of the recording operation (S3a). Although not shown in the flowchart, if the attached telephone 4 or extension handset 37 is off hooked before the recording start signal is input from the CPU 24 of the recording unit 3, the recording unit 3 is deactivated and the voice communication is made available.

If the recording start signal indicative of the start of the recording operation is input from the CPU 24 of the recording unit 3 at step 3a, the timer 15 is activated to start measuring a 7.5-second period (S4a). Simultaneously, the voice counter 18 is activated to start measuring the voice period (S5a). Between the activation of the timer 15 and voice counter 18 and the detection of on hook of the recording unit 3 by the first off hook detecting circuit 40, the judgment operation as shown in FIGS. 8(B) and 8(C) is performed. Specifically, during the recording operation by the recording unit 3, it is judged whether the CNG signal has been detected twice, a non-voice situation has continued eight seconds, the instantaneous interruption has been detected, the handset 23 of the attached telephone 4 or the extension handset 37 has been off hooked, the stop key (will be described) has been manipulated and the on hook of the recording unit 3 has been detected (S6a–S12a).

These judgments will be explained with FIG. 8(B). First, it is judged whether the CNG signal is detected twice. If the CNG signal is detected twice, then it is judged whether the timer 15 indicates a time within seven seconds and half (S6a and S13). If the answer is yes, i.e., if the CNG signal is detected twice within seven seconds and half from the input of the recording initiation signal, it is considered that there is no voice message from the calling side and the erasure command signal is sent to the CPU 24 of the recording unit 3 (S14a). On the other hand, if the CNG signal is detected twice after seven seconds and half from the input of the recording initiation signal, then it is judged whether the count value of the voice counter 18 is greater than five (S15a).

If the count value of the voice counter 18 is greater than five, it is recognized that there is a voice message from the calling side and a recording termination command signal is sent to the CPU 24 of the recording unit 3 (S16a). On the other hand, if the count value is not greater than five, it is considered that there is no voice message from the calling side and the program proceeds to step 14a to send the erasure command signal to the CPU 24 of the recording unit 3.

Upon sending one of these two signals (erasure command signal or recording termination command signal), the CML relay 36 is switched to the point b so that the telephone line 5 is connected with the modem 10 side. Accordingly, a prescribed facsimile operation is initiated to receive the image data from the calling side (S17a).

Specifically, if the CNG signal from the calling side is detected twice, the facsimile machine 1 on the called side considers that the calling side is a facsimile. Then, predetermined facsimile signals are transmitted between the calling side and the called side (e.g., a CED signal and a DIS signal are transmitted to the calling side from the calling side and a DCS signal is transmitted to the called side from the calling side.). After that, the recorder 14 is activated to print the image data sent from the calling side on a recording sheet. Upon completion of the facsimile data reception, the line is disconnected and the facsimile machine 1 is brought into a standby state (the answering/facsimile mode in this embodiment).

It should be noted that the CNG signal is regularly sent from the calling side every three seconds and each signal lasts 0.5 second. Detecting the CNG signal twice means successively detecting the CNG signal twice at a 3-second interval. The frequency of the CNG signal is 1,110 Hz and the frequency range of a human voice includes this value (1,100 Hz). Therefore, it is not possible to reliably judge by the once detection of the CNG signal whether it is a human voice or a CNG signal. Here, it should also be noted that the CNG signal of 0.5 second is regularly transmitted at the 3-second intervals whereas the human voice signal is transmitted random. Thus, if a signal of 1,110 Hz is detected twice at a 3-second interval, it is doubtlessly believed that this signal is a CNG signal and it is possible to reliably Judge that the calling side is a facsimile and the facsimile operation can be started. If the time interval between the first detection and the second detection of a signal of 1,100 Hz is not in a range of two seconds and half to six seconds, it is not considered that this signal is a CNG signal and the facsimile operation is not started.

If the CNG is not detected twice at step 6a, then it is judged whether a non-voice situation continues eight seconds (S7a). If the answer is yes, it is then judged whether the non-voice situation detecting time is within seventy seconds from the input of the recording start signal from the CPU 24 of the recording unit 3 (S18a). If it is after seventy seconds, a recording end command signal is sent to the CPU 24 of the recording unit 3 (S19a), the line is disconnected and the facsimile machine 1 is brought into the standby condition. On the other hand, if the non-voice situation is detected within seventy seconds from the input of the record start signal, it is judged whether the count value of the voice counter 18 is greater than two (S20a).

If the count value of the voice counter 18 is greater than two, the facsimile machine 1 considers that there is a voice message from the calling side and the recording termination command signal is sent to the CPU 24 of the recording unit 3 (S21a). Then, the program proceeds to step 17a. On the other hand, if the count value is not greater than two, it is considered that there is no voice message from the calling side and the erasure command signal is sent to the CPU 24 of the recording unit 3 (S22a) and the program proceeds to step 17a.

Specifically, if a voice signal or the like is not detected for eight seconds continuously or the non-voice situation lasts eight seconds, it is considered that the transmission of the voice message from the calling side is terminated or there has not been no voice message. If the non-voice situation is detected after seventy seconds from the input of the recording start signal or the initiation of the recording, it is considered that only the voice message is sent from the calling side and no facsimile message is sent. As a result, the recording end command signal is sent to the CPU 24 of the recording unit 3 and the line is disconnected. On the other hand, if the non-voice situation is detected within seventy seconds from the start of the recording operation, it is considered that the calling side has transmitted a voice message and a facsimile message (image data) or has transmitted only the facsimile message. A fact that the CNG signal is not detected at step 6a indicates that the CNG signal is not detected since the calling side sends a facsimile message by way of manual transmission. After that, the facsimile operation is started.

If the non-voice situation is not detected at step 7a, it is then judged whether the first off hook detecting circuit 40 detects the instantaneous interruption (S8a). If the instantaneous interruption is detected, it is judged whether the count value of the voice counter 18 is more than two (S23a).

If the count value of the voice counter 18 is three or more, it is considered that there is a voice message from the calling side and the recording termination command signal is sent to the CPU 24 of the recording unit 3 (S24a). Thereafter, the line is disconnected and the facsimile machine 1 is brought into the standby condition. On the other hand, if the count value is two or less, it is considered that there is no voice message from the calling side and the erasure command signal is sent to the CPU 24 of the recording unit 3 (S25a). Thereafter, the line is disconnected and the facsimile machine 1 is brought into the standby condition.

If the instantaneous interruption is not detected at step 8a, it is then judged whether the detection signal indicative of the off hook of the telephone 37 is input from the second off hook detecting circuit 41 (S9a). If the off hook detection signal is input, the recording end command signal is sent to the CPU 24 of the recording unit 3 and the voice communication becomes available (S26a and S27a). If the handset 23 of the attached telephone 4 is off hooked, the voice communication becomes available without sending the recording end command signal (S10a and S27a).

The judgment on the off hook of the handset 23 at step 10a is actually made by the CPU 24 of the recording unit 3, not by the CPU 7 of the facsimile main body 2. However, this is explained in connection with step 10a for easier understanding.

If the calling side is a telephone at step 27a, the voice communication is made between the calling side and the called side. If the facsimile communication is desired after the voice communication, a start key (not shown) is manipulated to start the facsimile operation. If the calling side is a facsimile and a facsimile signal such as a CNG signal is sent from the calling side, the facsimile machine 1 on the called side performs the facsimile operation. After completion of the voice communication or facsimile communication, the line is disconnected and the facsimile machine 1 is brought into the standby condition.

If the off hook state is not detected at steps 9a and 10a, it is judged whether a stop key (not shown) is manipulated (S11a). The stop key is connected to the CPU 7 of the facsimile main body 2 to stop the facsimile operation. Upon manipulation of the stop key, the recording end command signal is sent to the CPU 24 of the recording unit 3 (S28a). After that, the line is disconnected and the facsimile machine 1 is brought into the standby condition.

If the on hook of the recording unit 3 is detected by the first off hook detecting circuit 40 without detection of the CNG signal, the non-voice situation, the instantaneous interruption, the off hook of the telephone 37 or 4 and the manipulation of the stop key at steps 6a–11a (S12a), the line is disconnected and the facsimile machine 1 is brought into the standby condition. For example, the recording unit 3 is on hooked if the maximum recording period (five minutes) elapses during the recording operation. Then, when the on hook of the recording unit 3 is detected by the first off hook detecting circuit 40, the judgment at step 12a becomes yes and the line is disconnected to bring the facsimile machine 1 into the standby condition.

Figure 9:
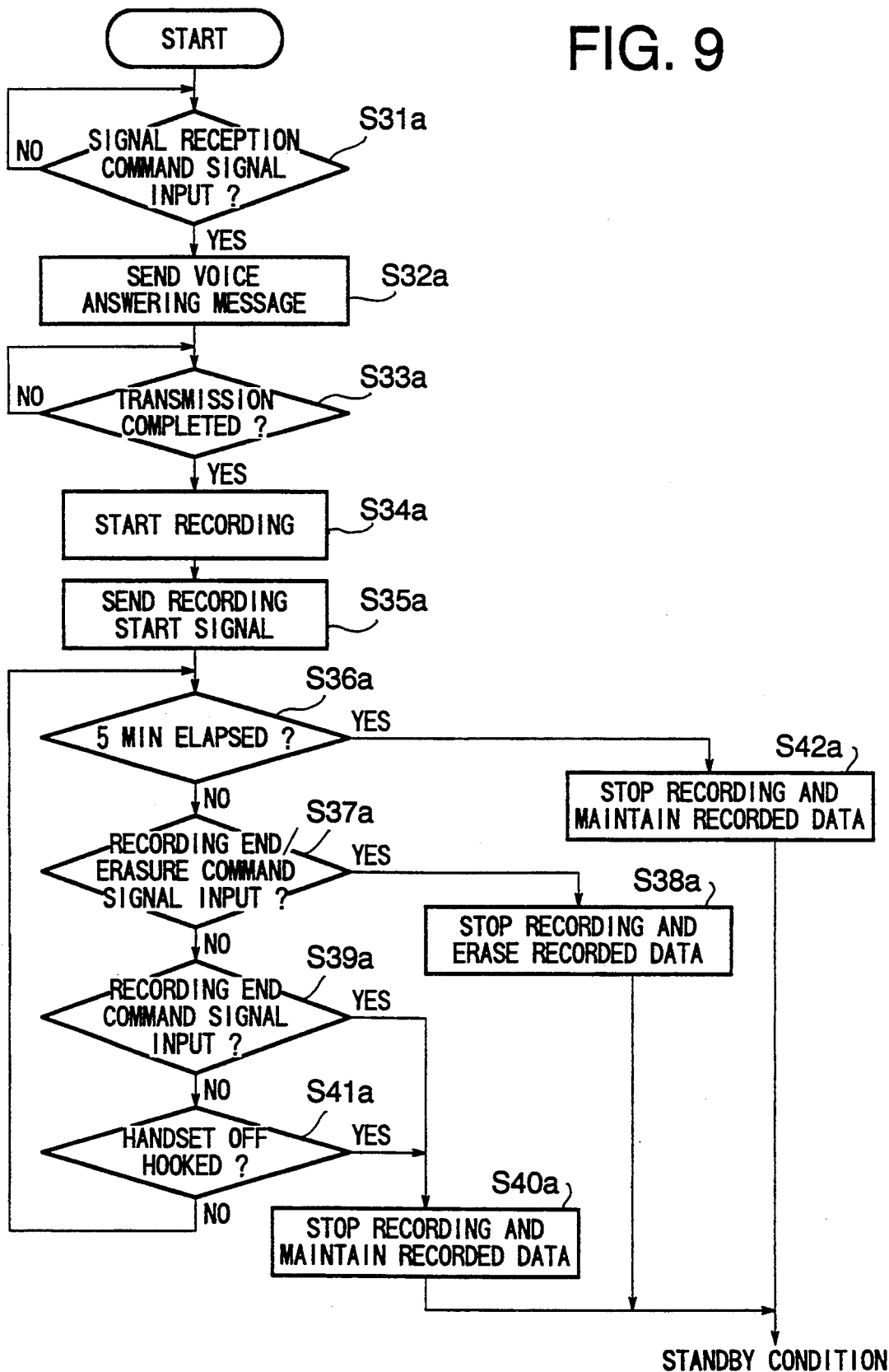
FIG. 9 is a flowchart of an reception mode of a recording unit of the facsimile machine according to the second embodiment.

On the other hand, in response to the operation of the facsimile main body 2, the recording unit 3 performs its own operation under the control of the CPU 24, as indicated by the flowchart shown in FIG. 9. Specifically, upon input of the signal reception command signal from the CPU 7 of the facsimile main body 2 (S31a), the DSP 27 is activated and the data of answering voice message is read from the RAM 30. This data is decoded by the coding/decoding circuit 31 and sent to the calling side via the NCU 6 and the telephone line 5 (S32a).

Upon completion of the answering voice message, the DSP 27 starts the recording operation and the recording start signal is sent to the CPU 7 of the facsimile main body 2 (S33a–S35a). If the voice message arrives from the calling side, the data of the voice message is coded in the coding/decoding circuit 31 and stored in the RAM 30. If the CNG signal is transmitted from the calling side or the instantaneous interruption sound is generated on the calling side upon the on hooking, it is also recorded and stored in the RAM 30.

If the erasure command signal is input from the CPU 7 of the facsimile main body 2 before the maximum recording period (five minutes) elapses from the initiation of the recording operation, the recording operation by the DSP 27 is stopped and the data recorded in the RAM 30 by this recording operation is erased (S36a–S38a). Then, the facsimile machine 1 is brought into the standby condition.

If the record end command signal is input before the maximum recording period of five minutes elapses, the recording operation by the DSP 27 is terminated and the data recorded in the RAM 30 by this recording operation is maintained (S39a and S40a). Then, the facsimile machine 1 is brought into the standby condition.

If the off hook of the handset 23 of the attached telephone 4 is detected by the dial CPU 21 before the maximum recording period (five minutes) elapses, the program proceeds to step 40a (S41a). In this case, the voice communication is made available.

If five minutes elapses without the detection of the input of the erasure command signal, the input of the recording end command signal or the off hook of the handset 23, the recording operation of the DSP 27 is terminated and the data (sound) recorded in the RAM 30 by this recording operation is maintained (S42a). Then, the facsimile machine 1 is brought into the standby condition.

As mentioned above, when the facsimile machine 1 having a telephone answering function of this embodiment is set to the answering/facsimile mode and receives a signal from the calling side, the DSP 27 of the recording unit 3 is activated, the voice answering message is sent to the calling side from the RAM 30 and the recording operation is started. After the initiation of the recording operation, if the CNG signal from the calling side is detected twice or the non-voice situation is continuously detected for eight seconds within seventy seconds from the initiation of the recording operation, the facsimile machine 1 considers that the calling side is a facsimile machine and uses itself for the facsimile operation. If the instantaneous interruption is detected after the initiation of the recording operation, the called side considers that the handset is on hooked on the calling side and disconnects the line.

If the detection timing for the CNG signal is within seven seconds and half from the initiation of the recording operation, it is considered that there is no voice message from the calling side and only a facsimile message is sent. Then, the recording operation is terminated and the sound recorded in the RAM 30 during this recording operation is erased. If the timing for the CNG signal detection is after seven seconds and half from the initiation of the recording, it is judged on the count value counted by the voice counter 18 during the recording operation whether the recorded sound in the RAM 30 should be erased or not. Specifically, if the count value of the voice counter 18 is five or less, the called side considers that the facsimile message is transmitted from the calling side without the voice message so that the recording operation is stopped and the sound recorded during this recording operation and stored in the RAM 30 is erased. On the other hand, if the count value is six or more, the called side thinks that the facsimile message arrives after the voice message so that the sound stored in the RAM 30 is maintained after the termination of the recording operation.

In other words, a fact that the CNG signal is detected within a short period (within seven seconds and half) from the initiation of the recording operation is believed to indicate that the calling side has sent no voice message. In such a case, the recorded information is erased so that it is possible to reliably avoid a case where only the CNG signal of 1,100 Hz is recorded or the non-voice situation is recorded. This eliminates a problem of unpleasantness to the operator and the waste of the memory capacity in the RAM 30 of the recording unit 3.

On the other hand, a fact that the CNG signal is detected after a long period (after seven seconds and half) from the initiation of the recording operation is believed to indicate that the voice sent to the facsimile machine 1 is two CNG signals only and there is a voice message from the calling side if the count value of the voice counter 18 is not greater than six. For example, if the calling side sends the CNG signal manually and the manipulating timing delays, more than seven seconds and half may be required to detect the CNG signal even if no voice message is sent from the calling side. In such a case, the recorded information is erased. Therefore, it is possible to prevent that only the CNG signal is recorded or the non-voice is recorded. This eliminates a problem of unpleasantness to the operator and the waste of the memory capacity in the RAM 30 of the recording unit 3.

If the CNG signal is detected after a long period (seven seconds and half) from the initiation of the recording operation and the count value of the voice counter 18 is more than five, the called side thinks that the voice from the calling side includes the voice message in addition to the two CNG signals. In this case, the recorded sound is not erased so that the operator on the called side can play and know the voice message. This eliminates a problem of unnecessary erasure of necessary voice message.

If the non-voice situation is detected within seventy seconds from the initiation of the recording operation and the count value of the voice counter 18 is not greater than three, the called side thinks that a facsimile message is transmitted from the calling side by way of manual transmission without voice message. Then, upon termination of the recording operation, the sound recorded during this recording operation and stored in the RAM 30 is erased. If the count value is more than two, the called side thinks that the facsimile message is transmitted from the calling side by way of manual transmission after the voice message. After that, the recording operation is terminated with the recorded sound stored in the RAM 30 being maintained.

Specifically, if the non-voice situation is detected within seventy seconds from the initiation of the recording operation and the count value or the voice counter 18 is not greater than three, it is hardly believed that there is a voice sent from the calling side. In such a case, the recorded sound is erased. Therefore, even if the non-voice is recorded, it is erased before the playing. This eliminates a problem of discomfort upon playing the recorded sound and a problem of wasting the memory area in the RAM 30 of the recording unit 3.

On the other hand, if the non-voice situation is detected within seventy seconds from the initiation of the recording operation and the count value of the voice counter 18 is greater than two, it is believed that there is a voice message sent from the calling side. In such a case, the recorded sound is not erased but maintained. Therefore, the operator on the called side can play the voice message. This eliminates a problem of undesired erasure of necessary voice message.

If the instantaneous interruption is detected and the count value of the voice counter 18 is not greater than three, it is believed that the voice transmitted to the facsimile machine 1 includes the instantaneous interrupting sound (e.g., clanging sound) only and there is no voice message from the calling side. In this case, the recording operation is terminated and the sound recorded during this recording operation and stored in the RAM 30 is erased. Therefore, even if the non-voice is recorded, it is erased before the playing. This eliminates a problem of discomfort upon playing the recorded sound and a problem of wasting the memory area in the RAM 30 of the recording unit 3.

If the instantaneous interruption Is detected and the count value of the voice counter 18 is greater than two, it is believed that the voice transmitted to the facsimile machine 1 includes not only the instantaneous interrupting sound (e.g., clanging sound) but the voice message. In this case, the recording operation is terminated and the sound recorded during this recording operation and stored in the RAM 30 is maintained. Therefore, it is possible to eliminate a problem of unnecessary erasure of necessary voice message.

It should be noted that the present invention is not limited to the above described embodiment and various modifications and changes may be made within the scope and spirit of the present invention. For example:

(i) The measuring of a seven-second-and-half period by the timer 15 may not be performed. If the CNG signal is detected twice, it may be determined only on the count value of the voice count 18 whether the recorded sound should be erased or not;

(ii) When the CNG signal is detected twice, the recorded sound is erased if the count value of the voice counter 18 in not larger than six in the embodiment. However, this threshold count value may be set a value other than six. In addition, when the non-voice situation is detected or the instantaneous interruption is detected, the recorded sound is erased if the count value of the voice counter 18 is not larger than three in the illustrated embodiment. However, this critical count value may be set to a value other than three;

(iii) The measuring period by the time 15 is seven seconds and half in the embodiment. However, seven seconds and half may be changed to another value;

(iv) The detection time for the non-voice situation may be set to a value other than eight seconds; and (v) The facsimile operation may be initiated if the CNG signal is detected once.

We claim:

1. A fax machine having a telephone answering function, comprising:

recording means for recording audio information from a caller, receiving means for receiving image data from a caller, means for measuring a first time period after initiation of recording audio information from a caller, voice measuring means for measuring the duration of voice input during recording of audio information from a caller, the voice measuring means comprising a voice counter, erasure means for erasing recorded audio information from a caller when the measured duration of voice input during recording of audio information from a caller is not greater than a first time period, means for stopping recording and preserving recorded information when a substantially continuous absence of voice information from a caller is detected for a fifth predetermined time period within the second predetermined time period and the voice counter provides a count value greater than a predetermined value, and means for stopping recording and erasing recorded information when a substantially continuous absence of voice information from a caller is detected for a fifth predetermined time period within the second predetermined time period and the voice counter provides a count value not greater than the predetermined value.

2. A fax machine having a telephone answering function, comprising:

recording means for recording audio information from a caller, receiving means for receiving image data from a caller, means for measuring a first time period after initiation of recording audio information from a caller, voice measuring means for measuring the duration of voice input during recording of audio information from a caller, the voice measuring means comprising a voice counter, erasure means for erasing recorded audio information from a caller when the measured duration of voice input during recording of audio information from a caller is not greater than a first time period, means for stopping recording and preserving recorded information when a CNG signal is detected a fifth predetermined number of times after a sixth predetermined time period after initiation of recording audio information from a caller and the voice counter provides a count value greater than a predetermined value, and means for stopping recording, erasing recorded information and starting fax operation when a CNG signal is detected a fifth predetermined number of times after a sixth predetermined time period after initiation of recording audio information from a caller and the voice counter provides a count value not greater than the predetermined value.

* * * * *